United States Patent
Li et al.

(10) Patent No.: US 8,504,882 B2
(45) Date of Patent: Aug. 6, 2013

(54) CIRCUITRY ON AN INTEGRATED CIRCUIT FOR PERFORMING OR FACILITATING OSCILLOSCOPE, JITTER, AND/OR BIT-ERROR-RATE TESTER OPERATIONS

(75) Inventors: Peng Li, Palo Alto, CA (US); Masashi Shimanouchi, San Jose, CA (US); Sergey Shumarayev, Los Altos Hills, CA (US); Weiqi Ding, Fremont, CA (US); Siriram Narayan, Pleasanton, CA (US); Daniel Tun Lai Chow, Foster City, CA (US); Mingde Pan, Morgan Hill, CA (US)

(73) Assignee: Altera Corporation, San Jose, CA (US)

( * ) Notice: Subject to any disclaimer, the term of this patent is extended or adjusted under 35 U.S.C. 154(b) by 377 days.

(21) Appl. No.: 12/884,305

(22) Filed: Sep. 17, 2010

(65) Prior Publication Data

US 2012/0072784 A1     Mar. 22, 2012

(51) Int. Cl.
*G06F 11/00* (2006.01)
(52) U.S. Cl.
USPC ............................. 714/704; 714/742; 375/226
(58) Field of Classification Search
USPC .................................... 714/704, 742; 375/226
See application file for complete search history.

(56) References Cited

U.S. PATENT DOCUMENTS

| 7,187,192 | B2 * | 3/2007 | Oshima et al. | 324/762.01 |
|---|---|---|---|---|
| 7,224,951 | B1 | 5/2007 | Chuang et al. | |
| 7,295,604 | B2 * | 11/2007 | Cranford et al. | 375/226 |
| 7,305,025 | B2 * | 12/2007 | Yamaguchi et al. | 375/226 |
| 7,363,562 | B2 * | 4/2008 | Waschura et al. | 714/731 |
| 7,397,847 | B2 * | 7/2008 | Ishida et al. | 375/226 |
| 7,636,387 | B2 * | 12/2009 | Yamaguchi et al. | 375/224 |
| 7,777,526 | B2 | 8/2010 | Shumarayev et al. | |
| 7,869,544 | B2 * | 1/2011 | Sorna et al. | 375/326 |
| 8,228,972 | B2 * | 7/2012 | Tonietto et al. | 375/221 |
| 2003/0023912 | A1 | 1/2003 | Lesea | |
| 2007/0277069 | A1 | 11/2007 | Bonneau et al. | |
| 2010/0086017 | A1 | 4/2010 | Shumarayev et al. | |
| 2010/0097087 | A1 | 4/2010 | Hogeboom et al. | |

FOREIGN PATENT DOCUMENTS

WO    WO03/044543    5/2003

* cited by examiner

*Primary Examiner* — Esaw Abraham
(74) *Attorney, Agent, or Firm* — Ropes & Gray LLP; Jeffrey H. Ingerman (57) ABSTRACT

An integrated circuit ("IC") includes circuitry for use in testing a serial data signal. One such IC includes circuitry for transmitting the serial data signal with optional jitter, optional noise, and/or controllably variable drive strength. One such IC also includes circuitry for receiving the serial data signal and performing a bit error rate ("BER") analysis in such a signal. Such an IC provides output signals indicative of results of its operations. One such IC operates in various modes to perform or at least emulate functions of an oscilloscope, a bit error rate tester, etc., for testing signals and circuitry with respect to jitter-tolerance, noise-tolerance, etc.

28 Claims, 6 Drawing Sheets

CIRCUITRY ON AN INTEGRATED CIRCUIT FOR PERFORMING OR FACILITATING OSCILLOSCOPE, JITTER, AND/OR BIT-ERROR-RATE TESTER OPERATIONS

BACKGROUND

This disclosure relates to electronic circuitry such as integrated circuits ("ICs"), and more particularly to including on ICs circuitry for enabling the IC to perform (or at least facilitate the performance of) tests of the IC and/or other circuitry connected to the IC.

The increasing complexity of ICs increases the difficulty and expense of testing the performance of an IC with test equipment that is external to the IC. For example, not all points in an IC that it may be desirable to test may be sufficiently connected to an input/output pad or other similarly convenient externally accessible electrical connection attachment point of the IC. This can lead to a need for expensive, delicate, and difficult-to-use probes for accessing desired sites in the IC. A particular area of concern in this regard is the circuitry that is provided on many ICs for transmission and/or reception of high-speed serial data signals (e.g., serial data signals having serial data bit rates of about 1 gigabit per second ("1 Gbps") or more). Such circuitry typically requires several closely coupled circuit components, some of which may be controllably adjustable, and any of which may be a source of inadequate performance of the overall transmission or communication link or system (e.g., unless properly adjusted or calibrated). As will be demonstrated in subsequent sections of this disclosure, giving an IC the "on-board," "on-chip," or "on-die" ability to perform or at least support certain circuit test functions, especially in the high-speed serial data signal transmission area, can be very advantageous.

SUMMARY

In accordance with certain possible aspects of the disclosure, an integrated circuit ("IC") may include circuitry for use in testing a serial data signal. The IC may include circuitry for transmitting the serial data signal with optional jitter, optional noise, and/or controllably variable drive strength. Such transmission may be to circuitry external to the IC (but it may also include loop-back to other circuitry on the IC such as parts of the receiver circuitry mentioned below). The external circuits mentioned here may be a so-called device under test ("DUT"). The IC may also include circuitry for receiving the serial data signal and for performing a bit error rate ("BER") analysis on such a signal. Such reception may be from the above-mentioned external circuitry (but it may also include processing of the above-mentioned loop-back signal). The IC may provide output signals indicative of results of its operations. Such output signals may be applied to other circuitry external to the IC (e.g., display circuitry) so that a user can more conveniently (e.g., graphically) make use of those results. The IC may be able to operate in various modes to perform or at least emulate functions (or at least some functions) of an oscilloscope, a bit error rate tester, a pattern with jitter and/or noise generator, and/or other similar test equipment. For example, such tests can be of serial data signals and circuitry with respect to signal, jitter, noise measurements, jitter-tolerance, noise-tolerance, and other signal and circuit variables.

Further features of the disclosure, its nature and various advantages, will be more apparent from the accompanying drawings and the following detailed description.

DETAILED DESCRIPTION

High-speed serial data signalling is an extensively used technique for communicating data between various components in a system (e.g., between various integrated circuits ("ICs") on a printed circuit board ("PCB")). For example, such signalling is very widely used for data rates in excess of 1 gigabits per second ("1 Gbps"). In such signalling, clock (i.e., serial data bit timing) information is recovered from the data signal by the receiver ("RX") circuitry, rather than being sent directly (separately) from the transmitter ("TX") circuitry.

Figure 1:
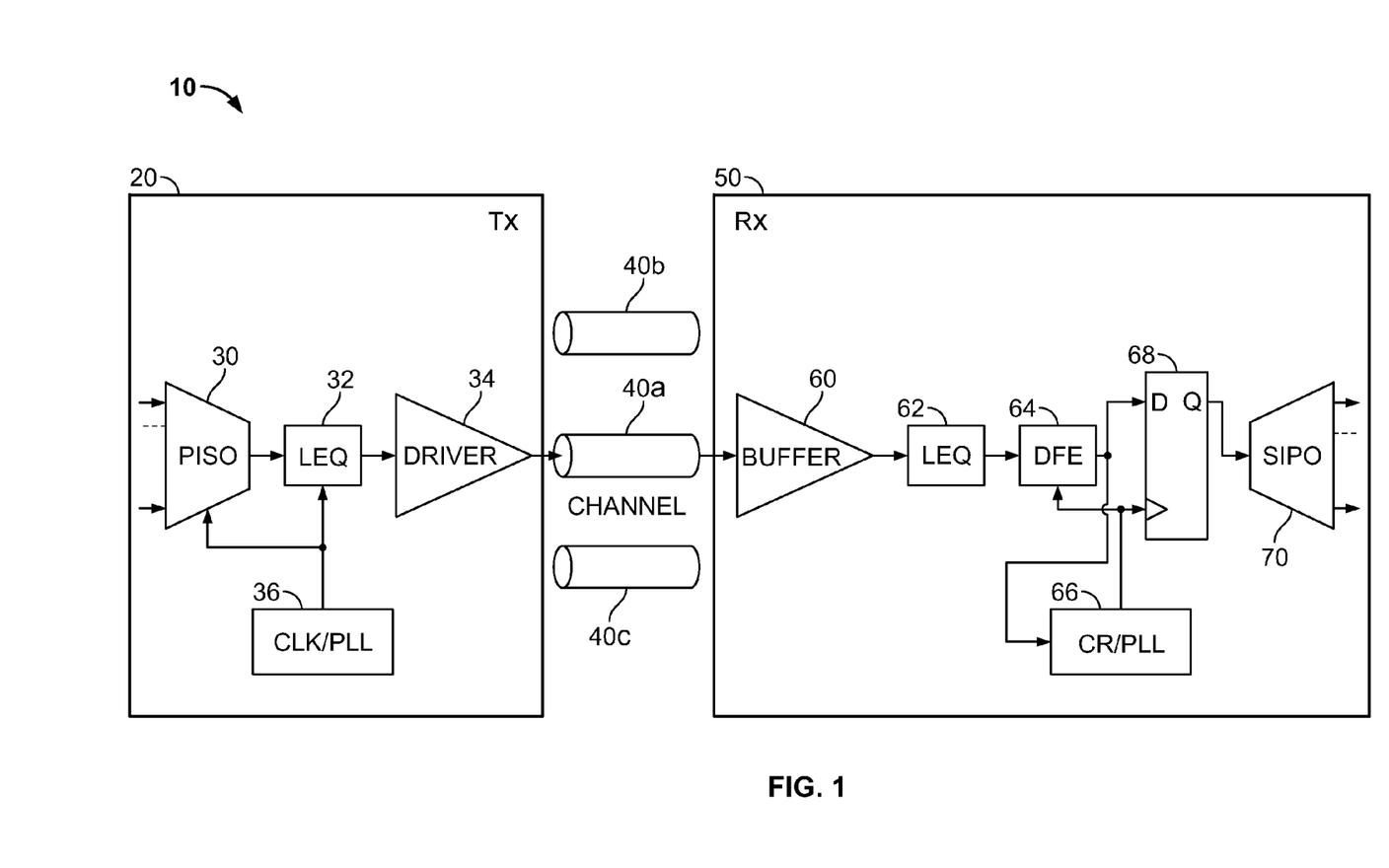
FIG. 1 is a simplified schematic block diagram of an illustrative embodiment of circuitry of a kind that it may be desired to test in accordance with certain possible aspects of the disclosure. Portions of the FIG. 1 circuitry may also be constructed in accordance with certain aspects of the disclosure.

FIG. 1 shows an example of a system 10 employing high-speed serial data signalling. System 10 includes transmitter ("TX") IC 20, receiver ("RX") IC 50, and serial data signal communication (transmission) channels 40a, 40b, 40c, etc., between those ICs. IC 20 includes parallel-in/serial-out ("PISO") converter circuit 30, which typically accepts (e.g., from other circuitry (not shown) on IC 20) successive "words" of parallel data bits (binary digits), and which then outputs each bit of each word one bit at a time, one bit after another (i.e., serially).

The serial data output signal of PISO 30 is applied to linear equalizer ("LEQ") circuitry 32. For example, LEQ 32 may be finite impulse response ("FIR") filter circuitry that gives the signal applied to it equalization via pre-emphasis and/or de-emphasis. Such equalization is typically designed to give the serial data signal extra energy immediately after each change in digital data value (e.g., from binary 1 to binary 0 or from binary 0 to binary 1) of the signal. This can help compensate (in advance) for expected degradation of the signal as it propagates through a transmission channel 40.

Clock ("CLK") and phase-locked-loop ("PLL") circuitry 36 provides one or more clock or timing signals, e.g., for timing serial data bit sequence generation and processing in circuit elements 30 and 32. Driver circuitry 34 provides the voltage levels needed to drive the serial data signal out onto a transmission channel, e.g., 40a.

FIG. 1 shows that there may be multiple transmission channels 40 between ICs 20 and 50. However, FIG. 1 shows only one of those channels (i.e., channel 40a) in use between TX driver 34 and RX buffer 60. Other instances (not shown) of TX and RX circuitry on ICs 20 and 50 may use other ones of channels 40. For example, IC 20 may not be exclusively a transmitter to IC 50 (and IC 50 may not be exclusively a receiver from IC 20). Rather, IC 20 may also include one or more instances of receiver circuitry (like that shown for IC 50 in FIG. 1) for receiving (via others of channels 40) serial data signals from one or more instances of transmitter circuitry in IC 50 (such IC 50 transmitter circuitry being like the transmitter circuitry shown for IC 20 in FIG. 1). In this way communication between ICs 20 and 50 may be bi-directional.

Each channel 40 may be a single electrical pathway (including, e.g., a printed circuit board ("PCB") signal trace) for so-called single-ended communication. Alternatively, each channel 40 may be a pair of electrical pathways (including, e.g., a pair of parallel PCB signal traces) for so-called differential signalling. Differential signalling employs two parallel signal constituents that are the logical complement of one another. Although two signal constituents are thus employed, such differential signalling may be referred to (for simplicity) using the singular form of words like signal. In other words, the two complementary signal constituents employed in differential signalling may be referred to collectively as "a differential signal." For at least most purposes in this disclosure it will not matter whether single-ended or differential signalling is employed between TX and RX circuitry. It will therefore generally not be necessary to specify which type of signalling is used in any particular embodiment shown and described herein.

Whatever circuitry is employed for transmission channels 40, the high-speed serial data signal in such a channel will be distorted at the channel output due to the channel's frequency-dependent loss characteristics. For any given channel 40 implementation, the higher the data rate, the worse the signal distortion tends to be. For example, a common manifestation of such distortion is so-called inter-symbol interference ("ISI"), which causes at least some bits in the received signal to have data value (or logical) level that is more difficult to reliably determine (e.g., due to contamination of the level of such a bit by artifacts from preceding and/or following bits). Thus, at the receiver input (e.g., in IC 50), the distorted attenuated signal may need to be "equalized" first before it is fed to clock and data recovery ("CDR") circuitry in the receiver IC. Any one or more of various equalization techniques may be used for this purpose. Examples include linear (e.g., continuous-time-linear) equalization ("CTLE"), feed-forward equalization ("FFE"), and/or adaptive (e.g., decision-feedback) equalization ("DFE").

Returning now to the illustrative circuitry shown in FIG. 1, IC 50 is shown as including receiver buffer circuitry 60 for receiving and buffering (e.g., amplifying) the serial data signal from transmission channel 40a. The output signal of buffer 60 is applied to linear equalizer ("LEQ") circuitry 62 (e.g., of the type mentioned in the immediately preceding paragraph, and for the purpose mentioned in that paragraph). The output signal of LEQ 62 is applied to further decision-feedback equalizer ("DFE") circuitry 64 (e.g., again of the type mentioned in the immediately preceding paragraph, and for the purpose mentioned in that paragraph).

The distortion-compensated, data-stream output signal of DFE 64 is applied to both the data ("D") input terminal of data-sampling flip-flop circuit 68, and to clock recovery ("CR") and phase-locked loop ("PLL") circuitry 66. CR/PLL 66 recovers clock information from the DFE 64 output signal (e.g., by producing a PLL output signal that is synchronized with logical/data level transitions detected in the DFE output signal). This recovered clock information can be used to provide a clock signal for use by DFE 64 and for clocking data-sampling flip-flop 68. In particular, the synchronization of this recovered clock signal is preferably such that flip-flop 68 takes successive samples of the DFE output signal at times that are best (optimal) for capturing each successive bit in the serial data signal output by DFE 64. For example, such an optimal sampling time may be midway between the times when successive data value transitions can occur in the DFE output signal.

The data bits (ideally all correct) recovered by flip-flop 68 are output one after another (i.e., serially) by that flip-flop. Such output of flip-flop 68 may sometimes be referred to as a retimed serial data signal. The retimed serial data signal is applied to serial-in/parallel-out ("SIPO") circuitry 70, which assembles successive groups of serial bits into successive "words" of parallel bits for output to other circuitry (not shown) on IC 50.

An important metric for measuring the performance of a high-speed input/output ("HSIO") link system is bit error rate ("BER"). Link system BER depends on jitter and noise from all of the relevant subsystems, as well as the TX, RX, channel, and link architectures. To ensure interoperability of the various components of such a system, many high-speed link standards (e.g., promulgated by industry groups formulating such standards) specify the signalling and electrical properties at the output of the TX and the input of the RX without specifying the details of the transmitter or receiver architectures (overall circuit organization and/or specific circuit components implementing that circuit organization). Verifying a link sub-system (e.g., TX, RX, channel, reference clock, etc.) to meet a particular HSIO standard is an important and necessary step for designing, building, and deploying an interoperable and high-quality HSIO link system. This can apply to both design validation and volume manufacture.

The on-going trend toward higher data rates implies smaller clock period values, which also means smaller unit interval ("UI") values. (The UI is the time duration of each successive bit in a serial data signal.) At the present time, many high-speed transceivers are designed to operate in the range of 5-6 Gbps. But many other communication standards have been developed that provide for transceivers operating in the range of 8-11 Gbps; and so that range is expected to become increasingly important. To maintain acceptably small BERs (e.g., $10^{-12}$ or $10^{-15}$), the jitter value time unit (now typically in the picosecond ("ps") range) needs to be reduced as the data rate increases. In other words, accuracy requirements become more stringent for link components and sub-systems, as well as the test and measurement equipment used to validate them. For example, the 2009 "International Technology Roadmap for Semiconductors" recommendation on tester accuracy for HSIOs suggests that less than 2 ps deterministic jitter ("DJ") and less than 100 femtosecond ("fs") random jitter ("RJ") (rms (root-mean-square)) are the expected accuracy for jitter testing at 10 Gbps. (1 ps equals 1000 fs.)

To achieve higher data rates and better jitter performance for external test and measurement equipment (e.g., oscilloscopes, bit error rate testers ("BERTs"), or time interval analyzers ("TIAs")), better and more accurate components are commonly used, along with more complex instrumentation architectures. These methods of using more accurate components and more complex architectures in order to enable external instruments to meet higher data rates inevitably lead to higher cost.

An example of test equipment challenges at higher data rates is receiver ("RX") equalization, especially adaptive equalization such as DFE (e.g., like 64 in FIG. 1). Because DFE is located at the receiver, and often the only observable to external equipment is BER (which is a manifestation of many possible failure mechanisms), it may not be effective or accurate to test DFE with external instruments. To test timing closure, specific DFE tap coefficients, and adaptation circuits, it is thought to be preferable (in accordance with this disclosure) to provide on-die instrumentation (circuitry), since all the internal signal nodes are readily accessible or easily made accessible. ("On-die" means circuitry that is integrated with all other integrated circuitry on an IC. Alternative terms for "on-die" include "on-chip" and "on-board.")

Another example of testing-related challenges at higher data rates is probing (i.e., electrical connections that are temporarily made to an IC so that external circuitry can be used to test the IC). High-speed, high-performance probes are difficult and expensive to make. In addition, they themselves introduce additional jitter and inaccuracy. In contrast, embedded testing in accordance with this disclosure removes the need for external probing and test/socket fixture interfaces, as well as eliminating associated measurement error and inaccuracy, and providing both cost and performance advantages.

In connection with certain possible aspects of this disclosure, it is pointed out that the transmitter of a transceiver can be used to help test the receiver (of the transceiver) if the transmitter has enough functionality, flexibility, programming/configuration capability, performance, and accuracy. Similarly, the receiver of a transceiver can be used to help test the transmitter (of the transceiver), again assuming the receiver has sufficient feature capabilities (e.g., as are mentioned for the transmitter in the immediately preceding sentence). Thus with some additional functionalities and circuit blocks in accordance with this disclosure, an advanced transceiver such as those in modern field-programmable gate arrays ("FPGAs") or the like can become a general-purpose, high-performance HSIO tester with significantly lower-cost than and other advantages over test equipment that is not integrated with the transceiver circuitry.

In certain of its possible aspects, this disclosure provides an on-die instrumentation architecture to overcome the testing challenges associated with high-speed input/outputs ("I/Os") that cannot be accounted for by off-chip instrumentation. This architecture can have the capabilities of bit error rate tester ("BERT") circuitry, oscilloscope circuitry, pattern generation/detection circuitry, jitter generation circuitry, and noise generation circuitry. A product (IC) with these capabilities may be referred to as an "on-die ScopeJBERT" product, where "on-die" refers to integration of the test circuitry with other circuitry on the IC, "Scope" refers to the oscilloscope-type capabilities of the product, "J" refers to the jitter-generation capabilities of the product, and "BERT" refers to the bit error rate tester capabilities of the product.

An on-die ScopeJBERT product can provide (1) jitter, signalling, and BER measurements; (2) data pattern, jitter, and noise generation; and (3) communication link testing under live traffic and stressed conditions. The on-die ScopeJBERT structure can be achieved at low cost, in part by utilizing some of the existing circuit blocks in a transceiver (such as a modern FPGA transceiver). It can also be helpful to employ so-called deep-submicron process technologies (e.g., 40 nanometer ("nm"), 28 nm, etc., semiconductor fabrication process technologies). High measurement speed (e.g., greater than 10 Gbps) and accuracy (less than 1 ps) may be facilitated by using advanced oscillator technologies (e.g., integrated inductor-capacitor ("LC") oscillators) with digitally assisted calibration. In summary, an on-die ScopeJBERT structure in accordance with this disclosure can solve the high-speed jitter, noise, and BER testing problem for high-speed serial data link systems and components (e.g., TX, channel, RX, reference clock, etc.) with comparable or better functionality and test coverage and accuracy, and at a cost that can be several orders of magnitude less than the cost of the collection of external laboratory instruments that would otherwise be required.

Figure 2:
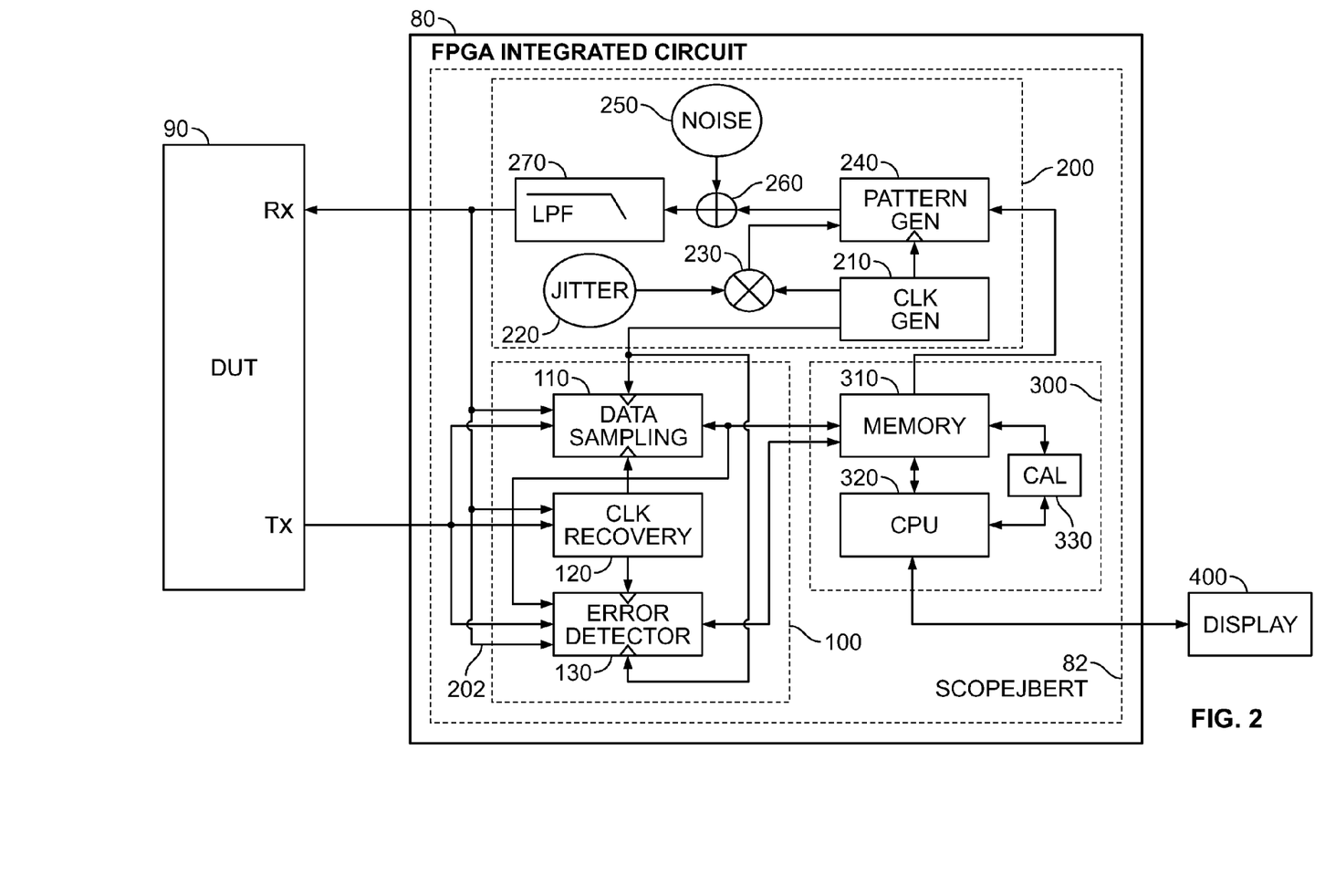
FIG. 2 is a simplified schematic block diagram that includes an illustrative embodiment of circuitry in accordance with certain possible aspects of this disclosure.

An illustrative embodiment of on-die ScopeJBERT circuitry 82 in accordance with certain possible aspects of this disclosure is shown in FIG. 2. As suggested by the earlier discussion herein, ScopeJBERT 82 is preferably a self-contained measurement system that is built (integrated) on an integrated circuit such as an FPGA 80. It will be understood that the FPGA embodiment is only illustrative, and that IC 80 may alternatively be a programmable logic device ("PLD"), a programmable microcontroller, or any other suitable type of integrated circuit. Typical characteristics for IC 80 as a whole are that it has at least some general- or multi-purpose capabilities, and that it is programmable or configurable in at least some respects. As shown in FIG. 2, ScopeJBERT circuitry 82 includes three main sub-blocks 100, 200, and 300.

Block 100 is the measurement subsystem having both scope and bit error (serial) measurement capabilities. The high-speed serial data signal from the transmitter ("TX") circuitry of a device under test ("DUT") 90 (typically another IC) is split into three identical signals. A first one of these signals is used as an input for data sampler circuitry 110, which can measure both waveform and edge (transition) information as a function of time. A second of the above-mentioned splits of the received signal is used as an input to clock recovery circuitry 120. A third of the above-mentioned received signal splits can be used for BER measurement by being applied to error detector circuitry 130.

The timing for both the scope (110) and BER (130) measurement functions can come from either the recovered clock (from 120) or a "clean" clock from pattern generation block 200 (described below).

Error detector circuitry 130 has additional inputs. One of these additional inputs comes from the output of data sampler circuitry 110. Another of these additional inputs comes from the pattern generator circuitry in block 200. This may be referred to as a loop-back connection 202 from block 200 to circuitry 130 because it preferably does not leave IC 80 and does not go through DUT 90. (The third input to circuitry 130 is the above-mentioned received signal from DUT 90.) An example of how circuitry 130 may use multiple ones of its inputs is described in the next paragraph.

With the received data (from DUT 90) and the output of data sampling circuitry 110 as the relevant inputs, circuitry 130 can measure BER without pre-knowledge of the incoming data bit sequence (or data pattern) (i.e., so-called vectorless BER measurement). This is done by having circuitry 130 compare each successive data bit output by circuitry 110 with the corresponding data bit detected by circuitry 130 in the signal that circuitry 130 receives directly from the DUT TX.

(Such a BER measurement can then be used to modify (control) one or more variable circuit elements and/or circuit architecture parameters in circuitry 110 until the BER is reduced to an acceptable level, e.g., comparable to the BER when the data has a known pattern such as from the pattern generator 240 in block 200.)

Block 100 calibration can be done by using the pattern generation circuitry in block 200 to generate a known (predetermined, particular) data pattern. An example is that this data signal is applied to circuitry 130 via internal loop-back connection 202. (DUT 90 is not used during such calibration.) Circuitry 130 compares the bits it detects in the signal it receives from connection 202 to the known pattern (e.g., supplied to circuitry 130 from memory 310) in order to produce a targeting error counter and BER value. One or more variable circuit element and/or circuit architecture parameters in circuitry 130 can then be controlled (modified) until this BER is reduced to an acceptable level. Such variable circuit element and/or architecture modification may alternatively or additionally be done in block 200 as part of calibration of the circuitry. For example, circuit element and/or architecture modifications may be made to the low-pass filter ("LPF") element in block 200. Alternatively, the reference pattern or signal can come from an external reference pattern or generator (e.g., placed at the Tx port of block 90), rather than from block 200. Similar calibration procedures can be used for block 110 and/or block 120.

Block 200 is the pattern, jitter, and noise generation subsystem. Block 200 includes clock signal generation circuitry 210, jitter generation circuitry 220, modulator circuitry 230 (for modulating the frequency of a clock signal produced by circuitry 210 in accordance with jitter produced by circuitry 220), data signal pattern generation circuitry 240, noise generation circuitry 250, modulator circuitry 260 (for modulating the amplitude of a data signal produced by circuitry 240 in accordance with noise produced by circuitry 250), and low-pass filter ("LPF") circuitry 270. Circuitry 220 can be used to produce what may be referred to as uncorrelated jitter (e.g., random jitter ("RJ")). Circuitry 270 can be used to produce what may be referred to as correlated jitter (e.g., inter-symbol interference ("ISI"), which is a major contributor to deterministic jitter ("DJ")).

In what may be referred to as a normal data pattern generation mode, circuitry 220, circuitry 250, and circuitry 270 are not enabled. This allows block 200 to output a data signal (e.g., from circuitry 240) that does not have any added uncorrelated jitter from circuitry 220, correlated jitter from circuitry 270, or noise from circuitry 250. In this "normal" mode, circuitry 210 provides a clock signal (applied directly to circuitry 240) as timing for the data pattern. The sequence of the data pattern may come from the memory circuitry 310 in block 300. (Note that this memory circuitry may also supply the data pattern to circuitry 130 in block 110. This enables circuitry 130 to determine a BER for the loop-back 202 signal in the calibration mode of operation mentioned earlier in this specification.) The voltage levels of the output signal(s) of block 200 are preferably controllably variable. For example, this can be done by controlling the drive strength of the pass band of circuitry 270 (even if the higher-frequency cut-off function of circuitry 270 is otherwise disabled, as it typically is for the normal data pattern generation mode being described in this paragraph).

In the jitter injection mode, either or both of the correlated (270) and the uncorrelated (220) jitter are enabled. For example, modulator 230 may be used to directly modulate the clock signal from circuitry 210 with uncorrelated jitter from circuitry 220 prior to use of the resulting jitter-modified clock signal (in circuitry 240) to time the output of successive bits in the data pattern generated by circuitry 240. Alternatively or in addition, correlated jitter may be added to the data output signal of block 200 by enabling the low-pass filter function of circuitry 270. The fact that LPF 270 then cuts off (strongly attenuates) frequencies in the data signal that are above the cut-off frequency of the low-pass filter function implemented by LPF 270 imparts correlated jitter to the data output signal of block 200.

In the noise injection mode (noise source 250 enabled), noise is introduced via amplitude modulation (260) downstream from pattern generation (240). In other words, modulator 260 modulates the amplitude of the data output signal of circuitry 240 in accordance with (based at least in part on) the noise signal output by circuitry 250.

Signal (e.g., voltage level), jitter, and noise calibration can be done via internal loop-back 202, measurement block 100, and control/process block 300. For example, for a given set of block 200 data output voltage level, jitter, and/or noise settings (values), variable circuit elements and/or variable circuit architecture aspects can be measured by circuitry 110. Programmed or expected voltage, jitter, or noise values versus corresponding measured values relationships are established. Regressional analysis can then be conducted and a nonlinearity calibration look-up table can be created and stored in memory to be used to remove the nonlinearity of circuit block 200. Alternatively, an external reference sampling oscilloscope may be used as the calibrator (e.g., be placed at the Rx port of block 90), rather than using block 100.

Block 300 is the control and process subsystem. The elements of block 300 include memory circuitry 310, central processing unit ("CPU") circuitry 320, and calibration control circuitry 330. For example, memory 310 may store data and other information for use by (or produced and output by) various other elements of the circuitry. CPU 320 may provide general computational and operating sequence control for other individual components and/or for the circuitry as a whole. CPU 320 may also output results of operations of the circuitry to display 400 in a form suitable for a user to observe on display 400. For example, this output may give display 400 the appearance of a signal analyzer or oscilloscope display. Calibration circuitry 330 (which may be controlled by signals from memory 310 and/or CPU 320) may be used to provide signals for controlling certain variable circuit elements and/or certain variable circuit architecture aspects in other parts of IC. As just some possible examples of this, output signals of circuitry 330 may control one or more of the following: (1) whether or not jitter circuitry 220 is enabled, and if it is enabled, one or more parameters (e.g., frequency, amplitude, etc.) of the jitter it produces; (2) whether or not noise circuitry 250 is enabled, and if its is enabled, one or more parameters (e.g., frequency, amplitude, etc.) of the noise it produces; (3) whether or not the low-pass filter function of circuitry 270 is enabled, and if it is enabled, one or more parameters (e.g., cut-off frequency of the LPF, steepness of roll-off (cut-off) of the LPF, etc.) of the filter function it produces; (4) voltage level of the data output signals of block 200; (5) circuit parameters in error detector circuitry 130; and (6) circuit parameters in data sampling circuitry 110. Thus there may be one or more control connections from circuitry 330 to various other elements such as 220, 250, 270, 130, and 110. These connections are not drawn in FIG. 2 to avoid unduly complicating the drawing. There may also be other control connections that are not shown in FIG. 2 for the same reason. Thus CPU 320 may provide various mode control and/or operating sequence control signals to other elements. Examples are (1) signals to tell circuitry 240 whether to use a clock signal straight from circuitry 210 or a jitter-modified clock signal from modulator 230; and (2) signals to tell circuitry 130 which of its input signals to operate on. Again, not all of these control connections are shown in FIG. 2 to avoid over-complicating the drawing.

From the foregoing it will be apparent that functions of block 300 may include (1) controlling, configuring, and/or programming other circuit elements and operations; (2) calibrating and setting such variable parameters as the data pattern, jitter, and/or noise generation; (3) waveform, jitter, and/or BER measurements; and/or (4) data collection, analysis, and/or display functionalities.

Figure 3:
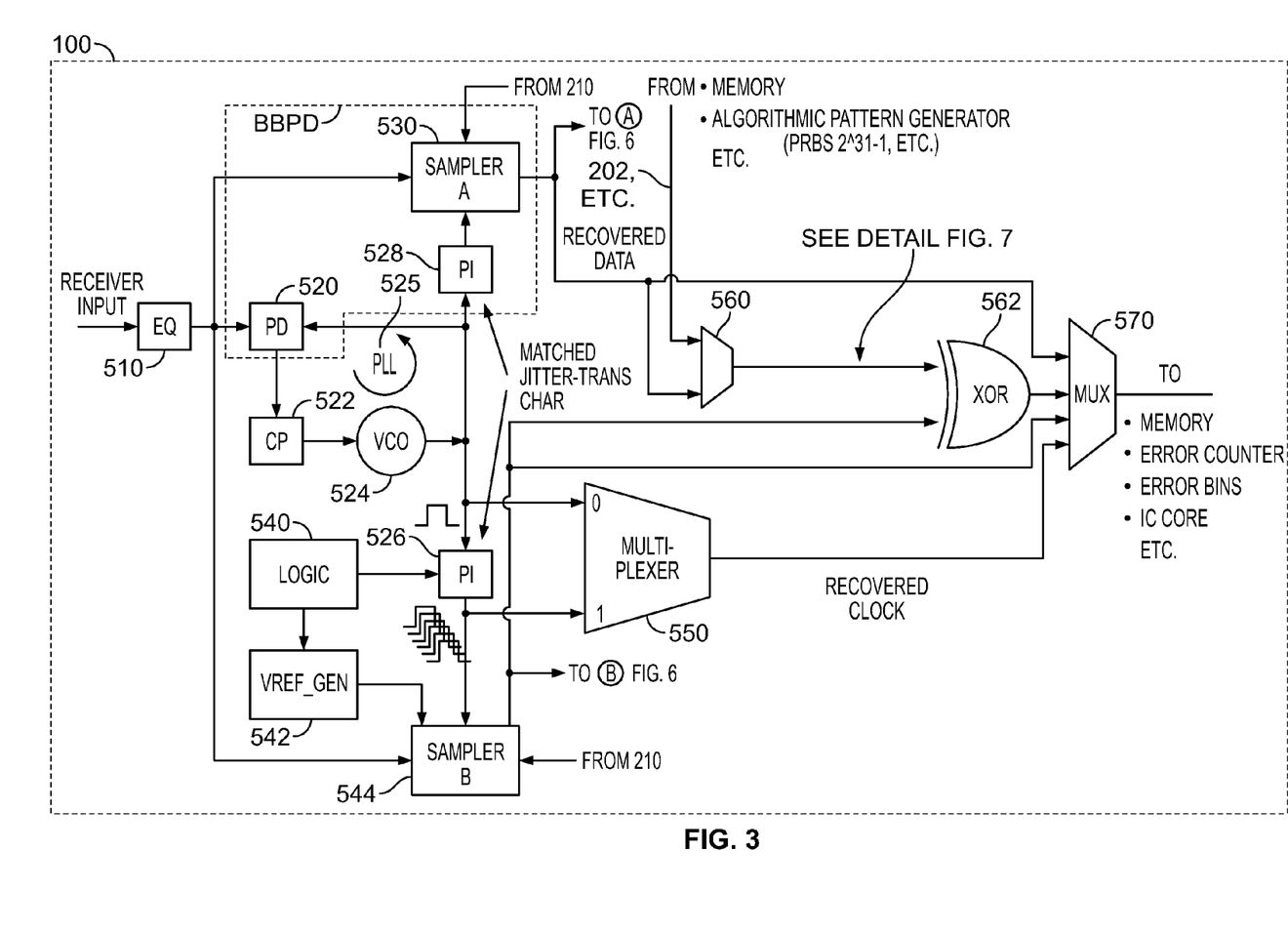
FIG. 3 is a more detailed, but still simplified, schematic block diagram of an illustrative embodiment of portions of the FIG. 2 circuitry in accordance with certain possible aspects of the disclosure.

An illustrative embodiment of block 100 circuitry is shown in more detail in FIG. 3. An input signal (e.g., from DUT 90 in FIG. 2) is applied to equalizer ("EQ") circuitry 510. This element may perform functions like those described earlier for elements like 62 and 64 in FIG. 1.

The output signal of equalizer 510 is applied to phase detector ("PD") circuitry 520, sampler circuitry 530, and sampler circuitry 544. Just to facilitate correlation with FIG. 2, phase detector 520 may be thought of as an initial component of clock recovery circuitry 120 in FIG. 2, sampler 530 may be thought of as a component of data sampling circuitry 110 in FIG. 2, and sampler 544 may be thought of as a component of error detector 130 in FIG. 2. Note that "BBPD" in FIG. 3 has the conventional meaning "bang-bang phase detector."

PD 520 compares the phase of (timing of transitions in) the signal from EQ 510 to the phase of (timing of transitions in) an output signal of voltage-controlled oscillator ("VCO") circuitry 524. PD 520 produces one or more output signals indicative of any difference between the two signal phases it compares. The output of PD 520 is applied to charge pump ("CP") circuitry 522, the output of which controls the frequency of oscillation of VCO 524 so that the VCO output phase matches the EQ output phase as closely as possible. Thus elements 520, 522, and 524 collectively form a so-called phase-locked loop ("PLL") circuit 525.

VCO 524 may actually produce several output signals, all having the same frequency, but each having a phase that is different from the phase of any other output of the VCO. For example, the phases of the several VCO output signals may be uniformly distributed across one period or cycle of any one of those signals. In other words, there may be equal phase difference between any two phase-adjacent ones of these VCO output signals. Thus PLL 525 may output all of these VCO 524 output signals (e.g., to each of phase interpolator ("PI") circuits 526 and 528, described below).

As was just mentioned, the output signals of PLL 525 (which, by virtue of the above-described operation of the PLL, have frequency and phase that bear a known relationship to the frequency (serial data bit rate) and phase (inter-bit transition timing) of the output signal of EQ 510) are applied to PIs 526 and 528. Each of these PIs generates a signal that can be used to control when the sampler 544 or 530 associated with that PI samples the data signal applied to that sampler to capture (or at least attempt to capture) (recover) each successive bit in the sampled signal. For example, each PI may generate its sampling clock output signal by interpolating phase between two phase-adjacent ones of the output signals of PLL 525 in order to produce a sampling clock signal with the best phase for data signal sampling, or alternatively a phase that it is desired to try for data signal sampling as part of a test operation in accordance with this disclosure.

Specifically with reference to PI 526, logic circuitry 540 can be used to control certain aspects of the phase interpolation operation of that PI. For example, logic 540 may cause PI 526 to make different phase interpolation phase selections at different times as the circuitry progresses through a particular calibration or test sequence. Logic 540 may also control the voltage level(s) that sampler 544 uses to determine whether a sample it has taken is a binary 1 or a binary 0. This may be done by having output signals of logic 540 control the value(s) of the reference voltage(s) that circuitry 542 generates and applies to sampler 544. Again, logic 540 may cause circuitry 542 to generate different reference voltage levels at different times as the circuitry progresses through a particular calibration or test sequence.

Figure 6:
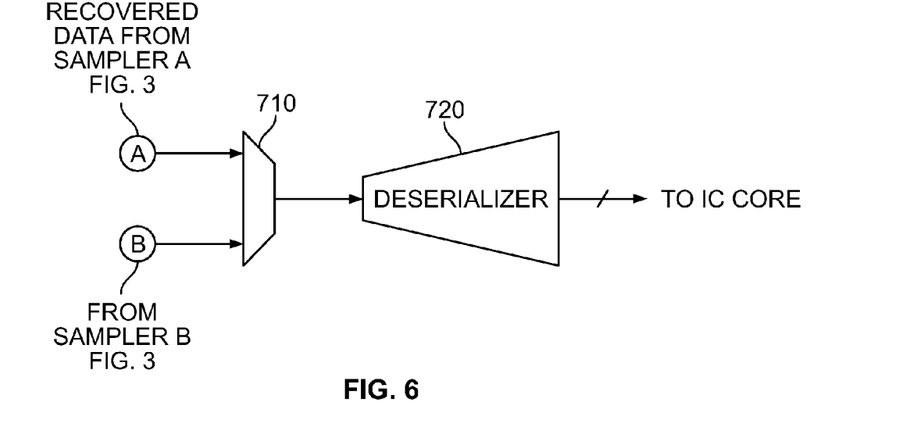
FIG. 6 is a simplified block diagram of an illustrative embodiment of circuitry that can be in addition to what is shown in FIG. 3 in accordance with certain possible aspects of the disclosure.

From the foregoing it will be seen how sampler 544 can produce a succession of samples of the output signal of EQ 510. These samples are applied to (1) one input of Exclusive OR ("XOR") logic gate 562, (2) one of the selectable inputs to multiplexer ("mux") 570, and (3) one of the selectable inputs to mux 710 (FIG. 6). From the foregoing, it will also be seen that these samples can be based on controllably variable phase interpolation (e.g., as performed by PI 526 at least partly under control from logic 540) and/or controllably variable sampler 544 reference voltage(s) (e.g., as produced by circuitry 542 at least partly under control from logic 540).

One of the output signals of PLL 525 going to PI 526 may also be applied to one of the selectable inputs to mux 550. The output signal of PI 526 is applied to the other selectable input to mux 550. Mux 550 is controllable by a selection control input signal (not shown) to select either of its selectable input signals to be its output signal (labelled "recovered clock" in FIG. 3). This recovered clock signal is applied to another one of the selectable inputs to mux 570.

Figure 5:
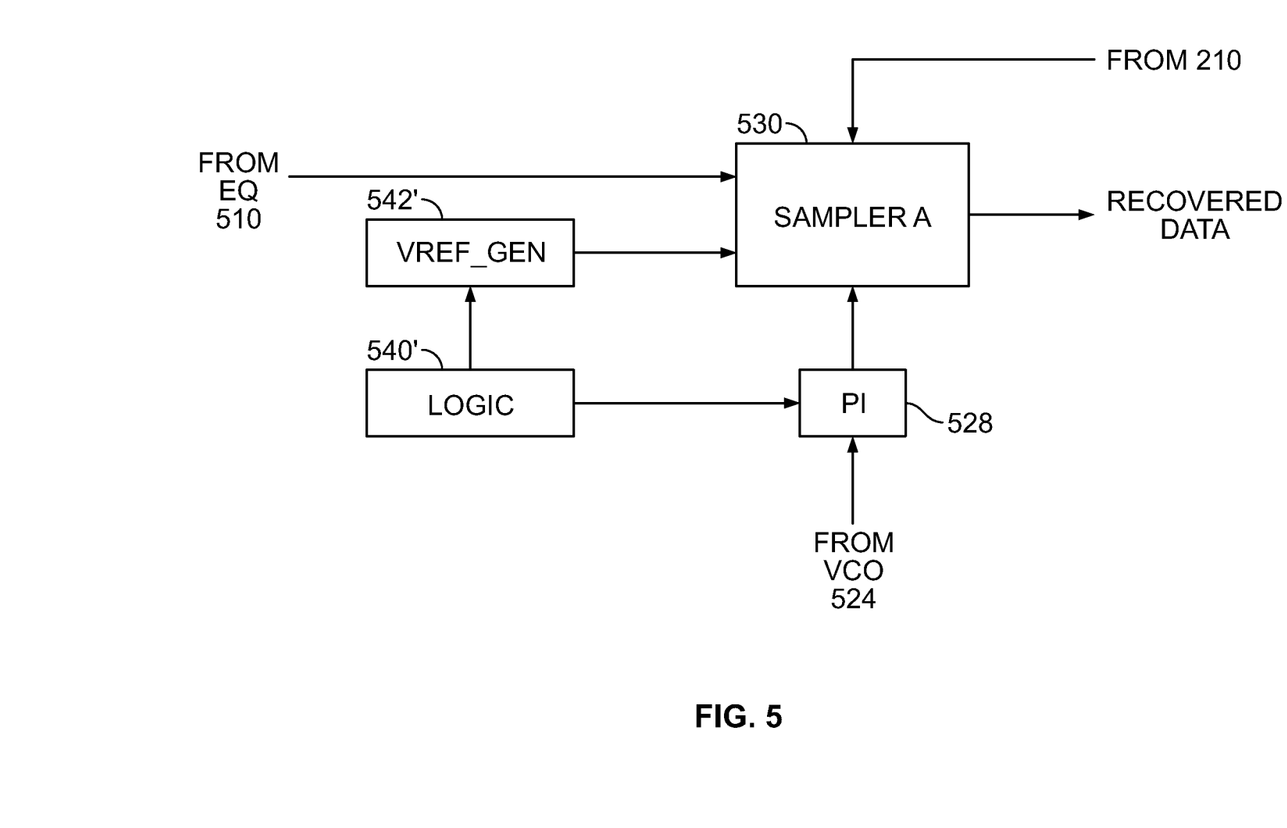
FIG. 5 is a simplified schematic block diagram showing additional circuit elements that may be included in circuitry of the type shown in FIG. 3 in accordance with certain possible aspects of the disclosure.

PI 528 may be similar to PI 526. Although PI 528 operates on the same set of PLL 525 output signals as PI 526, PI 528 can make its own phase interpolation independently of the phase interpolation performed by PI 526. (FIG. 5 shows that there can be other instances of logic and reference voltage generating elements like 540 and 542 associated with PI 528 and sampler 530. These other instances of elements 540 and 542 are respectively numbered 540' and 542' in FIG. 5. They can operate in relation to elements 528 and 530 in the same way that is described above for operation of elements 540 and 542 in relation to elements 526 and 544.) The phase-interpolated output signal of PI 528 is a sampling clock signal that can be used to control when sampler 530 takes each of its successive samples of the output signal of EQ 510. The resulting samples are the "recovered data" output of sampler 530. This recovered data signal may be applied to (1) one of the selectable inputs to mux 560, (2) one of the selectable inputs to mux 570, and (3) one of the selectable inputs to mux 710 (FIG. 6).

As a controllably selectable alternative to using the output signal(s) of PI 526 as the sample-timing control signal in sampler 544, FIG. 3 shows that sampler 544 may alternatively get its sample-timing control signal from a source like clock generator circuitry 210 in FIG. 2. Similarly, as a controllably selectable alternative to using the output signal(s) of PI 528 as the sample-timing control signal in sampler 530, FIG. 3 shows that sampler 530 may alternatively get its sample-timing control signal from a source like clock generator circuitry 210 in FIG. 2.

FIG. 3 shows that the other selectable input to mux 560 may come from a memory (e.g., memory 310 in FIG. 2) or from algorithmic data pattern generator circuitry (e.g., pseudo-random bit sequence ("PRBS") generator circuitry). For example, CPU 320 in FIG. 2 may include such data pattern generator capability and may therefore be the source of a data pattern signal generated in this way (i.e., by performance of an algorithm rather than by simply recalling a predetermined data bit sequence from memory 310). Although FIG. 3 shows only one input to mux 560 for both a memory data pattern and an algorithmic data pattern, it will be understood that if both such types of data patterns are of possible interest, then an additional mux may be provided upstream from mux 560 for making a controllable selection between those types of patterns, or mux 560 may have separate selectable inputs for each of the possibly desired types of pattern. The pathway discussed in this paragraph may also be the route by which loop-back connection 202 enters circuitry 100 as shown in FIG. 3.

Figure 7:
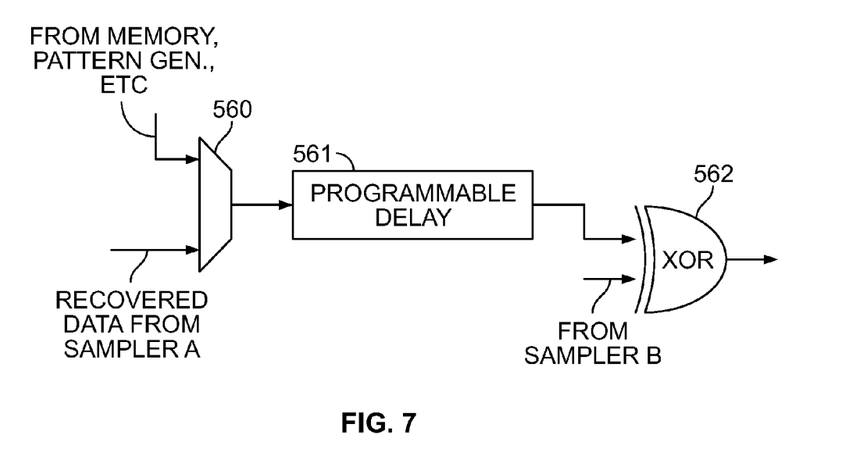
FIG. 7 is a simplified block diagram of an illustrative embodiment of other circuitry that can be in addition to what is shown in FIG. 3 in accordance with certain possible aspects of the disclosure.

In general, mux 560 is able to select one of its selectable inputs as the second input to XOR gate 562. (FIG. 7 shows that, if desired, programmable delay circuitry 561 can be included in the circuit path from mux 560 to XOR gate 562 for giving the mux 560 output signal a programmably controllable amount of delay before the mux 560 output signal is applied to XOR gate 562. This can help to improve synchronization between the two inputs to XOR gate 562.) XOR gate 562 compares the two signals applied to it for BER purposes. In particular, XOR gate 562 outputs a binary (logical) 1 whenever its two inputs do not match one another. Otherwise, XOR gate 562 outputs a binary (logical) 0. A binary 1 output from XOR gate 562 therefore indicates the occurrence of a data mismatch between the signals applied to that gate. Each such binary 1 signals the occurrence of an error in handling (interpreting) the data. The output signal of XOR gate 562 is applied to another selectable input to mux 570.

Although depicted for simplicity in FIG. 3 as a mux, circuitry 570 may actually be somewhat more general, controllable, routing circuit for routing any of its selectable inputs to various destinations that are appropriate for each of those inputs. (The particular routing implemented by circuitry 570 may be determined by selection or routing control signals (not shown) applied to that circuitry.) For example, these destinations may include memory circuitry (e.g., memory 310 in FIG. 2), error counter circuitry (e.g., implemented in CPU 320 in FIG. 2), error bin circuitry (e.g., registers in CPU 320), etc. As just one somewhat more specific example, if an error counter is being implemented in CPU 320, then mux 570 may route both the output of XOR gate 562 and a recovered clock signal from mux 550 to CPU 320. The output of XOR 562 is the data input to the error counter, and the recovered clock signal can be the signal for clocking the counter.

Reviewing certain aspects of the FIG. 3 circuitry, it will be seen that differential-timing signalling with a dual PI architecture is used to provide a better match of propagation delay and phase for both the sample A (530) and sample B (544) paths. (The two PIs thus referred to as "dual" are 526 and 528. The propagation delay thus referred to is delay in the PIs.) This architecture helps to provide what may be referred to as "common-mode" jitter cancellation (e.g., because the two PIs 526 and 528 have matched jitter transmission characteristics). This architecture also provides better timing, jitter, and BER measurement accuracy. As has been noted, sampling clock phase control is done with PI 526, and voltage level control is done with controllable voltage reference generator 542. Mux 560 allows serial BER measurement to be achieved either using a vector (with data pattern available) or vectorlessly (reference data pattern not used). In either case, the comparison for BER is performed by XOR gate 562.

Figure 4:
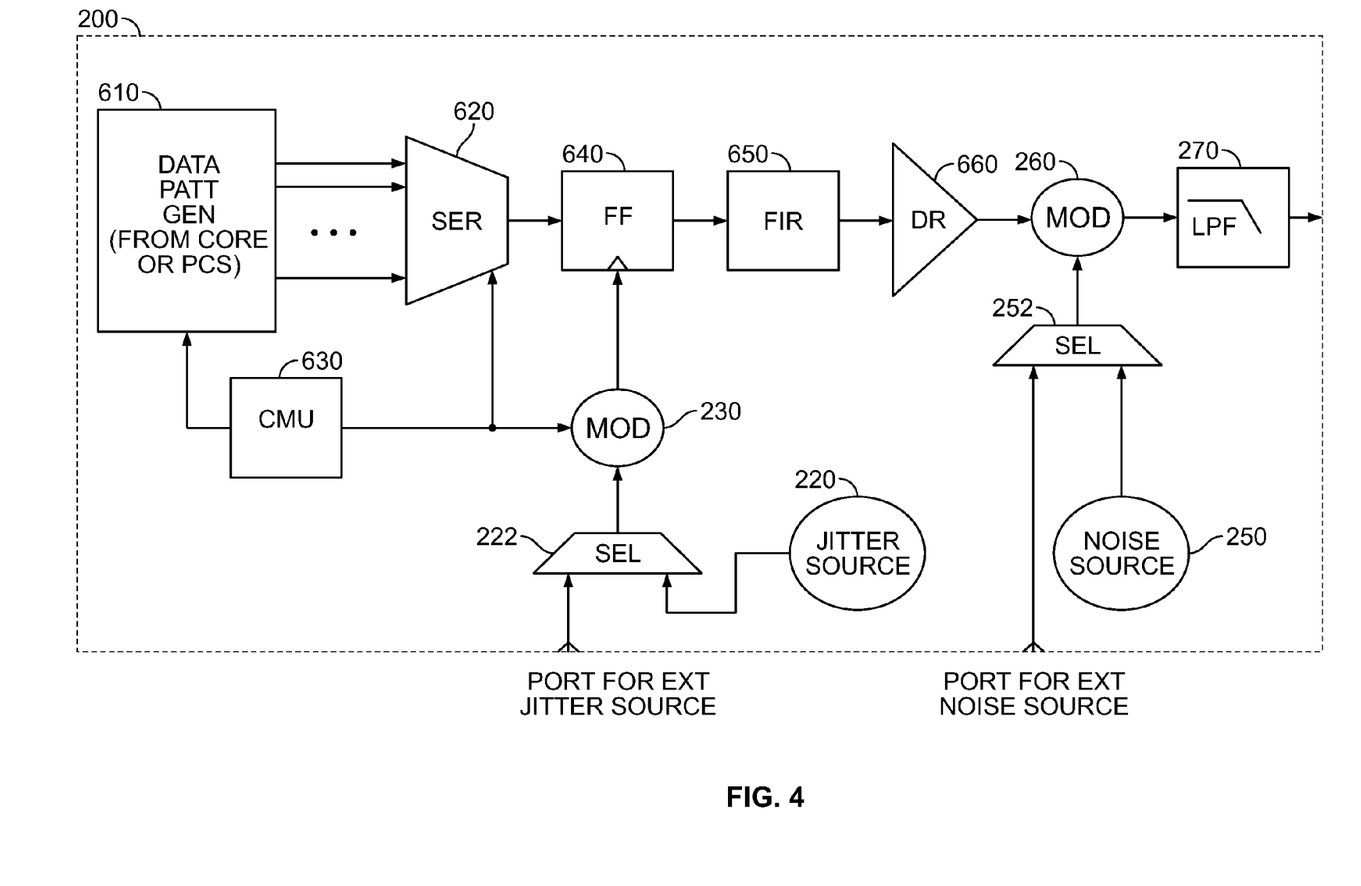
FIG. 4 is a more detailed, but still simplified, schematic block diagram of an illustrative embodiment of other portions of the FIG. 2 circuitry in accordance with certain possible aspects of the disclosure.

An illustrative embodiment of block 200 circuitry (FIG. 2) is shown in more detail in FIG. 4. In this embodiment, on the data path, digital pattern sequences can come from "core" circuitry on IC 80 (e.g., FPGA core circuitry such as general-purpose programmable logic, memory, etc., in cases in which IC 80 is an FPGA) or physical coding sub-layer ("PCS") circuitry of IC 80. (PCS circuitry is typically circuitry that is "dedicated" (e.g., substantially hard-wired) to performing particular functions, for example, in order to help interface the main or core portions of IC 80 to external circuitry. For example, PCS circuitry may include circuitry for performing code conversion functions such as 8B:10B or 64B:66B conversions.) The source 610 (core or PCS) may supply the data pattern on a plurality of parallel, low-speed bit lanes. (In this case "data pattern" does not necessarily mean a predetermined data pattern from memory or a purposely-determined pattern such as PRBS, but can alternatively be any data.) Clock management (or multiplier) unit ("CMU") circuitry 630 may supply a low-speed clock signal for clocking each successive parallel data pattern word out of source 610 into serializer 620. CMU 630 may also supply a high-speed clock signal to the serial-out side of serializer 620 in order to enable the serializer to convert each input parallel data pattern word to a serial data pattern output signal.

The high-speed clock signal output by CMU 630 is also applied to modulator 230 (e.g., as in FIG. 2). The other input to modulator 230 is the output signal of selection (multiplexer, mux) circuitry 222. Circuitry 222 has two selectable inputs: (1) the output signal of jitter source circuitry 220 (e.g., as in FIG. 2), and (2) a signal from a port that allows IC 80 to be connected to an external jitter source. Like other mux or selection circuitry throughout this disclosure, circuitry 222 is controllable by an applied selection control signal to select either of its selectable input signals to be its output signal. Thus mux 222 allows jitter that is used by modulator 230 to modulate the frequency of the high-speed clock signal applied to the modulator from CMU 630 to be either from internal jitter source 220 or a jitter source that is external to IC 80.

The possibly jitter-modulated clock signal that is output by modulator 230 is applied to the clock input terminal of flip-flop ("FF") circuitry 640. The data input to FF 640 is the serial data output signal of serializer 620. Accordingly, although the serial data pattern signal comes out of serializer 620 substantially without jitter, that signal may be output by FF 640 with jitter (i.e., irregularity in the timing of inter-bit transitions in the data signal) if the jitter circuitry (e.g., 220/222/230) is enabled.

Finite impulse response ("FIR") filter circuitry 650 may be transmitter equalizer circuitry (that is per se known) for giving the signal that is to be transmitted so-called pre-emphasis or de-emphasis.

Driver ("DR") circuitry 660 may be transmitter output driver circuitry (that is known per se) for giving the signal that is to be transmitted the voltage required for driving it off of IC 80 and into a transmission channel 40 (FIG. 1). For example, driver 660 may be controllable digital-to-analog converter ("DAC") or driver circuitry for generating the output digital signal at the target voltage level.

Modulator 260 (e.g., as in FIG. 2) may modulate the amplitude of the output signal of driver 660 in accordance with noise, either from internal noise source circuitry 250 (e.g., as in FIG. 2) or from a noise source that is external to IC 80. Selection circuitry 252 may be generally like circuitry 222 for making a controllable selection between noise from either internal source 250 or the above-mentioned external noise source.

LPF 270 (e.g., as in FIG. 2) operates on the output signal of modulator 260, and then outputs the resulting signal from block 200, all as described earlier in this specification (e.g., in connection with FIG. 2). In particular, it is again mentioned that the filter function (if enabled) that is implemented by LPF 270 is preferably controllably variable so that ISI can be generated in a controlled manner to mimic channel (e.g., 40) loss characteristics.

Returning briefly to the jitter circuitry (e.g., 220/222/230), it is specifically noted that the jitter (whether internal (220) or external) can be periodic jitter ("PJ") or random jitter ("RJ").

FIG. 6 shows that mux 710 can be used to apply the serial data output signal of either sampler A 530 or sampler B 544 in FIG. 3 to deserializer 720 (which corresponds to SIPO in FIG. 1). The parallel data output signals of deserializer 720 can be applied to other circuitry on IC 80 (FIG. 2) outside of Scope-JBERT circuitry 82. Such circuitry outside of circuitry 82 may be referred to generically as IC core circuitry. An illustrative example of IC core circuitry in an FPGA embodiment of IC 80 is the relatively general-purpose, field-programmable logic circuitry of the FPGA. The path for data through mux 710 is parallel to ScopeJBERT circuitry 82. Accordingly, ScopeJBERT circuitry 82 can operate concurrently with normal data flow to the IC core circuitry (and therefore concurrently with normal data processing by the IC core circuitry). Typically this "normal" data flow is from sampler A 530. Alternatively, inclusion of mux 710 allows data from sampler B 544 (a circuit element added (e.g., as compared to what is shown in FIG. 1) for purposes of functions like those performed by ScopeJBERT 82) to be applied to the IC core circuitry if it is desired to have the IC core circuitry perform some test functions instead of or in addition to using Scope-JBERT 82.

It will be understood that the foregoing is only illustrative of the principles of the disclosure, and that various modifications can be made by those skilled in the art without departing from the scope and spirit of the disclosure. For example, if less than all of the above-described features and capabilities are desired in a particular embodiment, elements that would provide those unneeded features and capabilities can be omitted from the circuitry.

What is claimed is:

1. Test circuitry on an integrated circuit ("IC") for use in testing serial data signal transmission comprising:
    transmitter circuitry on the IC for transmitting the serial data signal;
    receiver circuitry on the IC for receiving the serial data signal that was transmitted by the transmitter circuitry;
    circuitry on the IC for recovering data information from the received serial data signal;
    circuitry on the IC for recovering clock information from the received serial data signal; and
    circuitry on the IC for performing a bit error rate ("BER") analysis on the data information.

2. The test circuitry defined in claim 1 wherein the circuitry for performing comprises:
    circuitry for selectively comparing the data information to an expected data pattern.

3. The test circuitry defined in claim 1 wherein the circuitry for performing comprises:
    circuitry for sampling the received serial data signal to recover a stream of data from the received serial data signal; and
    circuitry for comparing the stream of data to the data information.

4. The test circuitry defined in claim 3 wherein the circuitry for sampling is controllable with respect to timing, within a unit interval ("UI") of the received serial data signal, when the circuitry samples the received serial data signal.

5. The test circuitry defined in claim 3 wherein the circuitry for sampling is controllable with respect to a reference voltage that is used in sampling the received serial data signal.

6. The test circuitry defined in claim 3 wherein the circuitry for sampling can use the clock information from the circuitry for recovering clock information as at least a partial basis for recovering the stream of data.

7. The test circuitry defined in claim 6 wherein:
    the circuitry for sampling comprises first phase interpolator ("PI") circuitry for operating on the clock information from the circuitry for recovering clock information to provide a signal for timing sampling of the received serial data signal by the circuitry for sampling; and
    the circuitry for recovering data information comprises second PI circuitry for operating on the clock information from the circuitry for recovering clock information to provide a signal for sampling the received serial data signal by the circuitry for recovering data information.

8. The test circuitry defined in claim 1 wherein the circuitry for recovering data information from the received serial data signal is controllable with respect to timing, within a UI of the received serial data signal, when the circuitry for recovering data information samples the received serial data signal to recover the data information.

9. The test circuitry defined in claim 1 wherein the circuitry for recovering data information from the received serial data signal is controllable with respect to a reference voltage that is used in sampling the received serial data signal to recover the data information.

10. The test circuitry defined in claim 1 wherein the circuitry for recovering data information can use the clock information from the circuitry for recovering clock information as at least a partial basis for recovering the data information.

11. The test circuitry defined in claim 1 wherein:
    the transmitter circuitry on the IC transmits the serial data signal off the IC; and
    the receiver circuitry on the IC receives the serial data signal, that was transmitted by the transmitter circuitry, back onto the IC after it has passed through circuitry external to the IC.

12. The test circuitry defined in claim 11 wherein:
    the circuitry for recovering data information and the circuitry for recovering clock information operate on the received serial data signal from the receiver circuitry; and
    the circuitry for performing a BER analysis selectively operates on the received serial data signal from the receiver circuitry.

13. The test circuitry defined in claim 11 further comprising:
    a loop-back connection on the IC from an output of the transmitter circuitry to the circuitry for performing a BER analysis.

14. The test circuitry defined in claim 11 wherein the transmitter circuitry comprises:
    circuitry for selectively giving jitter to a clock signal that is used to time occurrence of successive data bits in the serial data signal output by the transmitter circuitry.

15. The test circuitry defined in claim 11 wherein the transmitter circuitry comprises:
    circuitry for selectively adding noise to the serial data signal output by the transmitter circuitry.

16. The test circuitry defined in claim 11 wherein the transmitter circuitry comprises:
    circuitry for selectively subjecting the serial data signal output by the transmitter circuitry to a low-pass filter ("LPF") function.

17. The test circuitry defined in claim 16 wherein the passband of the LPF function is controllable.

18. The test circuitry defined in claim 11 wherein the transmitter circuitry comprises:
    driver circuitry for giving the serial data signal output by the transmitter circuitry controllably variable drive strength.

19. The test circuitry defined in claim 11 wherein the transmitter circuitry comprises:
    pattern generation circuitry for establishing a pattern for data bits in the serial data signal.

20. The test circuitry defined in claim 11 wherein:
    the transmitter circuitry transmits the serial data signal off the IC; and
    the receiver circuitry receives the serial data signal back onto the IC after it has passed through circuitry external to the IC.

21. The test circuitry defined in claim 1 further comprising:
    central processing unit ("CPU") circuitry for controlling at least some operations of the test circuitry.

22. The test circuitry defined in claim 21 wherein the CPU circuitry provides signals for displaying results of at least some operations of the circuitry to circuitry external to the IC.

23. The test circuitry defined in claim 22 wherein the circuitry external to the IC comprises display circuitry.

24. The test circuitry defined in claim 1 further comprising:
    calibration circuitry for controlling at least some parameters with which the circuitry operates.

25. The test circuitry defined in claim 1 further comprising:
    memory circuitry for storing at least some results of operations of the circuitry.

26. Test circuitry on an integrated circuit ("IC") for use in testing serial data signal transmission comprising:
    transmitter circuitry on the IC for outputting the serial data signal;
    error detector circuitry on the IC;
    loop-back circuitry on the IC for selectively applying the serial data signal output by the transmitter circuitry to the error detector circuitry so that the serial data signal from the loop-back circuitry is available to the error detector circuitry for performance of a bit error rate ("BER") operation on the serial data signal received from the loop-back circuitry; and
    calibration circuitry on the IC for controlling at least one operating parameter of at least one of the transmitter circuitry and the error detector circuitry to affect a result of the BER operation.

27. Test circuitry on an integrated circuit ("IC") for use in testing serial data signal transmission comprising:
    transmitter circuitry on the IC for outputting the serial data signal in which timing of successive bits is based at least in part on a clock signal produced by clock generator circuitry;
    circuitry on the IC for recovering data information from the serial data signal;
    circuitry on the IC for recovering clock information from the serial data signal; and
    circuitry on the IC for performing a bit error rate ("BER") analysis on the data information; wherein the clock signal and the clock information are selectably provided to the circuitry for performing for use of a selectable one of the clock signal and the clock information as at least part of a basis for timing operations of the circuitry for performing.

28. The test circuitry defined in claim 27 wherein the clock signal and the clock information are selectably provided to the circuitry for recovering data information for use of a selectable one of the clock signal and the clock information as at least part of a basis for timing operations of the circuitry for recovering data information.

* * * * *